United States Patent
Arasu et al.

(10) Patent No.: US 8,032,546 B2
(45) Date of Patent: Oct. 4, 2011

(54) TRANSFORMATION-BASED FRAMEWORK FOR RECORD MATCHING

(75) Inventors: Arvind Arasu, Redmond, WA (US); Surajit Chaudhuri, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 432 days.

(21) Appl. No.: 12/031,715

(22) Filed: Feb. 15, 2008

(65) Prior Publication Data

US 2009/0210418 A1    Aug. 20, 2009

(51) Int. Cl.
*G06F 7/00*    (2006.01)
*G06F 17/30*    (2006.01)

(52) U.S. Cl. .................................................. 707/769

(58) Field of Classification Search ........... 707/999.006, 707/758, 769, 780
See application file for complete search history.

(56) References Cited

U.S. PATENT DOCUMENTS

| | | | |
|---|---|---|---|
| 6,101,492 A * | 8/2000 | Jacquemin et al. | 1/1 |
| 6,374,241 B1 | 4/2002 | Lamburt et al. | |
| 6,654,717 B2 * | 11/2003 | Loofbourrow et al. | 704/9 |
| 6,938,053 B2 | 8/2005 | Jaro | |
| 6,961,721 B2 | 11/2005 | Chaudhuri et al. | |
| 7,155,427 B1 | 12/2006 | Prothia et al. | |
| 7,287,019 B2 | 10/2007 | Kapoor et al. | |
| 2004/0172393 A1 | 9/2004 | Kazi et al. | |
| 2004/0181527 A1 | 9/2004 | Burdick et al. | |
| 2005/0027717 A1 | 2/2005 | Koudas et al. | |
| 2007/0192342 A1 | 8/2007 | Shriraghav et al. | |
| 2010/0107055 A1 * | 4/2010 | Orelind et al. | 715/234 |

OTHER PUBLICATIONS

Winkler., "Matching and Record Linkage", US Bureau of Census, pp. 1-38, 1995.
Minton., et al, "A Heterogeneous Field Matching Method for Record Linkage", Proceedings of the Fifth IEEE International Conference on Data Mining (ICDM '05), 2005, pp. 1-8.
Martins., et al, "Semantic Similarity Match for Data Quality" Faculty of Sciences, University of Lisbon, Portugal, Nov. 2007, pp. 2-16.
Bilenko., et al, "Adaptive Duplicate Detection Using Learnable String Similarity Measures", Proceedings of Ninth ACM SIGKDD International conference on Knowledge Discovery and Data Mining (KDD-2003), WA,Aug. 2003, pp. 39-48.
Chaudhuri, et al., "Robust and efficient fuzzy match for online data cleaning", Proc. of the 2003 ACM SIGMOD Intl. Conf. on Management of Data, Jun. 2003, pp. 313-324.
Elmagarmid, et al.,"Duplicate record detection: A survey", IEEE Trans. on Knowledge and Data Engg., vol. 19, No. 1, Jan. 2007, pp. 1-16.

(Continued)

*Primary Examiner* — Kimberly Lovel
(74) *Attorney, Agent, or Firm* — Lyon & Harr, LLP; Katrina A. Lyon (57) ABSTRACT

A transformation-based record matching technique. The technique provides a flexible way to account for synonyms and more general forms of string equivalences when performing record matching by taking as explicit input user-defined transformation rules (such as, for example, the fact that "Robert" and "Bob" that are synonymous). The input string and user-defined transformation rules are used to generate a larger set of strings which are used when performing record matching. Both the input string and data elements in a database can be transformed using the user-defined transformation rules in order to generate a larger set of potential record matches. These potential record matches can then be subjected to a threshold test in order to determine one or more best matches. Additionally, signature-based similarity functions are used to improve the computational efficiency of the technique.

20 Claims, 7 Drawing Sheets

OTHER PUBLICATIONS

United States Postal Service, http://www.usps.com/, Apr. 22, 2008.

"Wikipedia" http://en.wikipedia.org/, Apr. 22, 2008.

"DBLP", http://www.informatik.uni-trier.de/~ley/db/index.html, Apr. 22, 2008.

"RIDDLE: Repository of Information on Duplicate Detection, Record Linkage, and Identity Uncertainty", http://www.cs.utexas.edu/users/ml/riddle, Apr. 24, 2008.

Winkler, "The state of record linkage and current research problems", US Bureau of Census, 1999. 15 pages.

"Trillium Software", www.trilliumsoft.com/trilliumsoft.nsf, Apr. 22, 2008.

Needleman, et al., "A general method applicable to the search for similarities in the amino acid sequences of two proteins", Journal of Molecular Biology, vol. 48, Mar. 1970, pp. 443-453.

Salton, et al., "Term-weighting approaches in automatic text retrieval", Information Processing and Management, vol. 24, Jan. 1988, pp. 513-523.

Miller, et al., "A hidden markov model information retrieval system", Proc. of the 22nd ACM SIGIR Conf. on Research and Development in Information Retrieval, Aug. 1999, pp. 214-221.

Gionis, et al., "Similarity search in high dimensions via hashing", Proc. of the 25th Intl. Conf. on Very Large Data Bases, Sep. 1999, pp. 518-529.

Chaudhuri, et al., "A primitive operator for similarity joins in data cleaning", Proc. of the 22nd Intl. Conf. on Data Engineering, Apr. 2006, pp. 1-12.

Tejada, et al., "Learning domain-independent string transformation weights for high accuracy object identification", Proc. of the 8th ACM SIGKDD Intl. Conf. on Knowledge Discovery and Data Mining, Jul. 2002, pp. 350-359.

Sarawagi, et al., "Interactive deduplication using active learning", Proc. of the 8th ACM SIGKDD Intl. Conf. on Knowledge Discovery and Data Mining, Jul. 2002, pp. 269-278.

Ananthakrishna, et al., "Eliminating fuzzy duplicates in data warehouses", Proc. of the 28th Intl. Conf. on Very Large Data Bases, Aug. 2002, pp. 586-597.

Dong, et al., "Reference reconciliation in complex information spaces", Proc. of the 2005 ACM SIGMOD Intl. Conf. on Management of Data, Jun. 2005, pp. 85-96.

Singla, et al., "Multi-relational record linkage", MRDM, 2004, pp. 1-18.

Bhattacharya, et al., "Collective entity resolution in relational data", IEEE Data Engineering Bulletin, vol. 29, No. 2, 2006, pp. 4-12.

Hopcroft, et al., "Introduction to Automata Theory, Languages and Computation", Addison Wesley, 1979, pp. 60-65.

Gravano, et al., "Approximate string joins in a database (almost) for free", Proc. of the 27th Intl. Conf. on Very Large Data Bases, Sep. 2001, pp. 491-500.

Sarawagi, et al., "Efficient set joins on similarity predicates", Proc. of the 2004 ACM SIGMOD Intl. Conf. on Management of Data, Jun. 2004, pp. 743-754.

Arasu, et al., "Efficient exact set-similarity joins", Proc. of the 32nd Intl. Conf. on Very Large Data Bases, Sep. 2006, pp. 918-929.

Koudas et al., "Record Linkage: similarity measures and algorithms", in Proc. of the 2006 ACM SIGMOD Intl. Conf. on Management of Data, Jun. 2006, pp. 802-803.

Chaudhuri et al.,"Example-driven design of efficient record matching queries", in Proc. of the 33rd Intl. Conf. on Very Large Data Bases, Sep. 23-28, 2007, pp. 1-12.

Bansal et al., "Correlation clustering", Mach. Learn., vol. 56, No. 1-3, 2004, pp. 89-113.

Chandel et al., "Benchmarking declarative approximate selection predicates", in Proc. of the 2007 ACM SIGMOD Intl. Conf. on Management of Data, Jun. 2007, pp. 353-364.

* cited by examiner

TRANSFORMATION-BASED FRAMEWORK FOR RECORD MATCHING

BACKGROUND

Conventional database searching technology typically requires exact matches to find database records. When the input string and the records searched do not match exactly a record search will not turn up a desired result. This is frustrating to users and detrimental to efficient business operations.

Record matching is an essential step in order to use databases for various business purposes. For example, various errors or ambiguities in data may cause a customer name in a sales record not to match exactly with the name of the same customer in a database table. A critical component of record matching involves determining whether two strings are similar or not. String similarity is typically captured via a similarity function that, given a pair of strings, returns a number between 0 and 1, a higher value indicating a greater degree of similarity with the value 1 corresponding to equality. There are many known similarity functions for computing the similarity of strings, such as, for example, Jaro distance, Jaro Winkler distance, Hamming distance, Jaccard similarity, cosine similarity, Euclidean distance, Levenstein distance, Smith-Waterman distance and Hellinger distance, just to name a few.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure pertains to a technique for providing a user-defined transformation-based framework for record matching. User-input transformation rules are used to create variation strings, such as, for example, synonyms and abbreviations, for input, as well as to create variation strings for database records. The technique further provides procedures for optimal evaluation of record matching results in the presence of transformations.

More specifically, one embodiment of a transformation-based record matching technique described herein provides a flexible way to account for synonyms and more general forms of string equivalences when performing record matching by taking as explicit input user-defined transformation rules (such as, for example, the fact that "Robert" and "Bob" that are synonymous). The input string and user-defined transformations are used to generate a larger set of strings which are used when performing record matching. Both the input string and data elements in a database can be transformed using the user-defined transformation rules in order to generate a larger set of potential record matches. These potential record matches can then be subjected to a threshold test in order to determine one or more best matches. Various types of string similarity functions can be used. Variations of the technique provide for increased efficiency of computing string equivalences by using signature-based similarity functions.

In the following description of embodiments of the disclosure, reference is made to the accompanying drawings which form a part hereof, and in which are shown, by way of illustration, specific embodiments in which the technique may be practiced. It is understood that other embodiments may be utilized and structural changes may be made without departing from the scope of the disclosure.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the transformation-based record matching technique, reference is made to the accompanying drawings, which form a part thereof, and which is shown by way of illustration examples by which the transformation-based record matching technique may be practiced. It is to be understood that other embodiments may be utilized and structural changes may be made without departing from the scope of the claimed subject matter.

1.0 Transformation-Based Record Matching Technique

The transformation-based record matching technique described herein provides a flexible way to account for synonyms and more general forms of string equivalences when performing record matching by taking as input user-defined transformation rules (such as, for example, the fact that "Robert" and "Bob" that are synonymous). In one embodiment the input string and user-defined transformations are used to generate a larger set of strings which is used when performing record matching. Both the input string and data elements in a database can be transformed using the user-defined transformations in order to generate a larger set of potential record matches. These potential record matches can then be subjected to a threshold test in order to determine one or more best matches. Various functions for determining string similarity can be used. Additionally, some embodiments use signature-based similarity functions to improve computational efficiency.

1.1 Overview

The goal of record matching is to find pairs of records that are similar. String matching is a critical component of record matching. In several embodiments of the transformation-based record matching technique strings are modeled as a sequence of tokens where each token is a smaller string. Conventional procedures that convert a string into a token sequence and vice versa can be employed. For example, a given string may be tokenized for instance by splitting it based on delimiters such as white spaces. By this method, the string Internal Revenue Service is converted to the sequence of tokens <Internal,Revenue,Service>. Henceforth, the term string is used to refer to a sequence of tokens and the term substring to refer to a (contiguous) subsequence of tokens.

1.2 Record Search and Matching Environment

Figure 1:
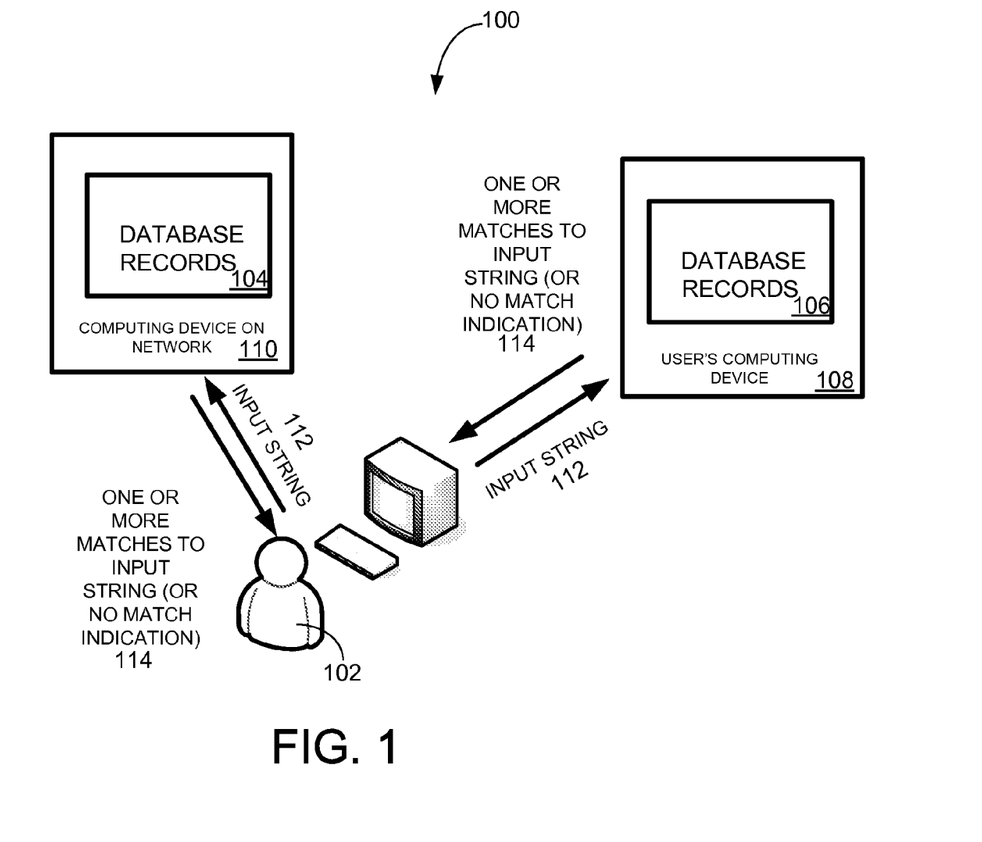
FIG. 1 provides an overview of one possible environment in which string matching can be carried out.

FIG. 1 provides a general overview of an exemplary environment 100 in which searches for a given record may be carried out. Typically, a user 102 searches for information in a database or other repository 104, 106 on their computing device 108 or on a computing device 110 on a network such as the Internet or on a Local Area Network (LAN) by inputting an input (e.g., search) string for which a match is sought 112. Record matching then takes place where the input string 112 is compared to the entries in the database 104, 106, returning to the user an exact match or records similar to the input string or a 'no match' indication based on the record matching procedures or algorithms used 114.

1.3 Exemplary Architecture

Figure 2:
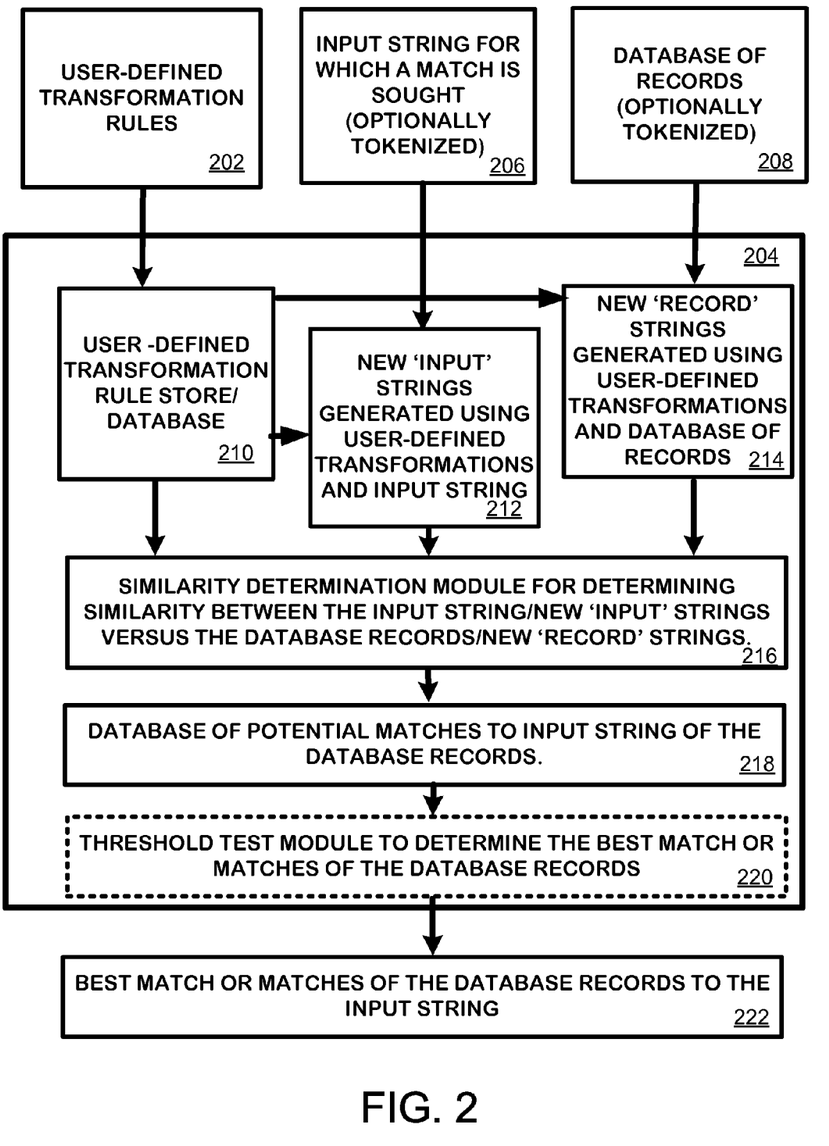
FIG. 2 is a diagram depicting one exemplary embodiment of an architecture in which the transformation-based record matching technique can be employed.

FIG. 2 depicts one exemplary architecture in which the transformation-based record matching technique can be practiced. One or more user-defined transformation rules are input into a record matching module 204 that resides on a computing device 700, such as will be discussed later with respect to FIG. 7. Additionally, an input string for which a match is sought 206 and a database of records 208 from which a match is sought are provided to the record matching module 204. The input string for which a match is sought 206 and the records of the database 208 can tokenized prior to entering them into the record-matching module 204. The user-defined transformations 202 can be stored in a user-defined transformation store/database 210. The user-defined transformation rules 202, 210 are used to generate new strings for the input string 212 and new strings for the records of the database of records 214. A similarity determination module 216 determines the similarity between the input string and new strings derived from the input strings 206, 212 and each record and generated new record strings 208, 214. Potential matches between the input string and the database records are identified based on the determined similarity 218. These potential matches can be subjected to a threshold test 220 to determine the best match or matches of the database records to the input string. The best match or matches of the database records to the input string 222 can then be output.

1.3 Exemplary Processes

Figure 3:
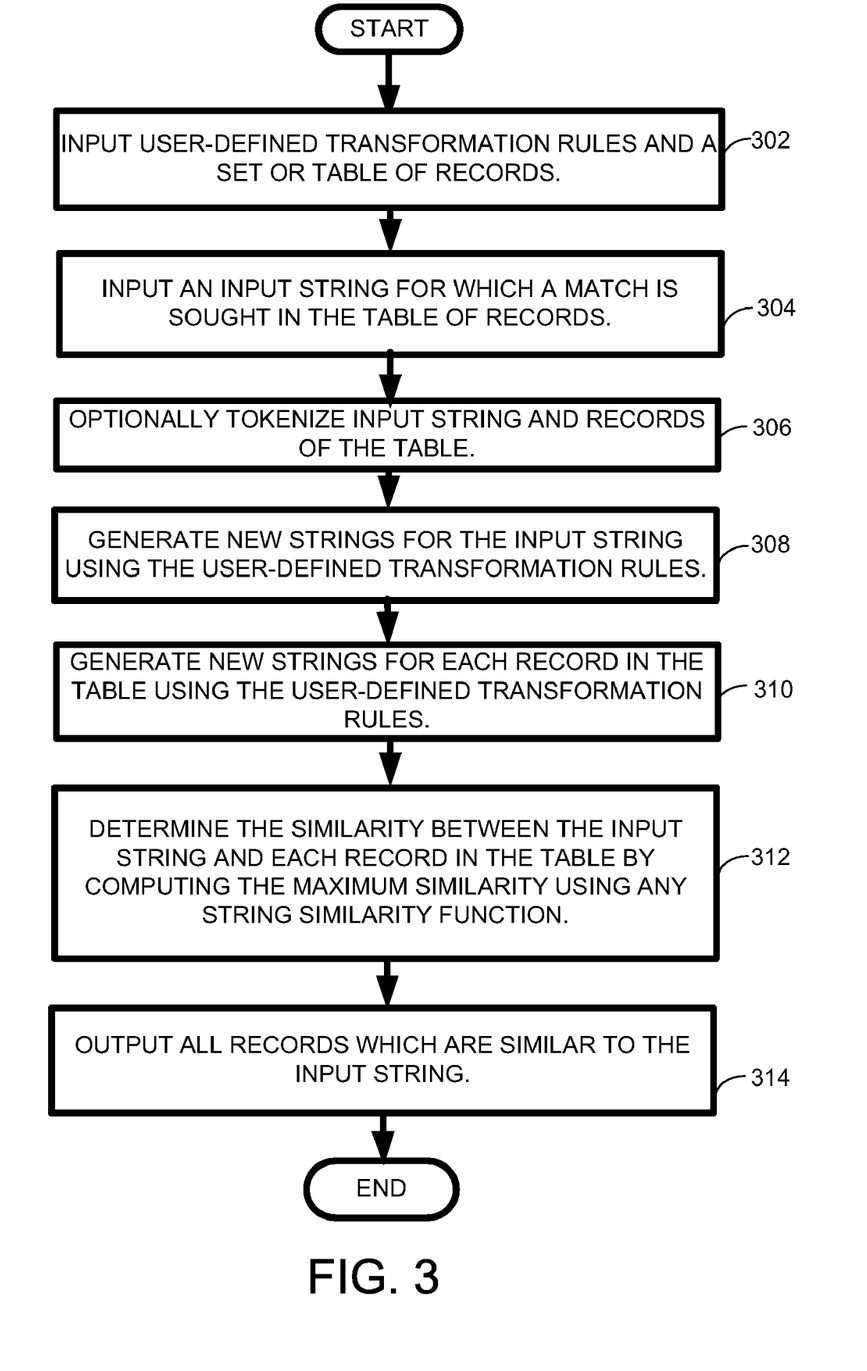
FIG. 3 is a flow diagram for one exemplary embodiment of a process for employing the transformation-based record matching technique.

FIG. 3 provides a general flow diagram of one exemplary process for employing the transformation-based record matching technique. In this embodiment, user-defined transformation rules and a table of records are input (box 302). An input string for which a match is sought in the table of records is also input (box 304). The input string and the records of the database of records can be tokenized, breaking each of the input string and each record of the table into substrings (box 306). New strings are generated for the input string, or tokenized input string, using the user-defined transformation rules (box 308). Similarly, new strings are generated for each record of the table of records using the user-defined transformation rules (box 310). The similarity between the input string and each record in the table is determined by computing the maximum similarity between a string generated from the input string and a string generated from the record (box 312). The similarity between the generated strings is computed using any one of many known string similarity functions. All records of the table that are similar to the input string are then output (box 314).

Figure 4:
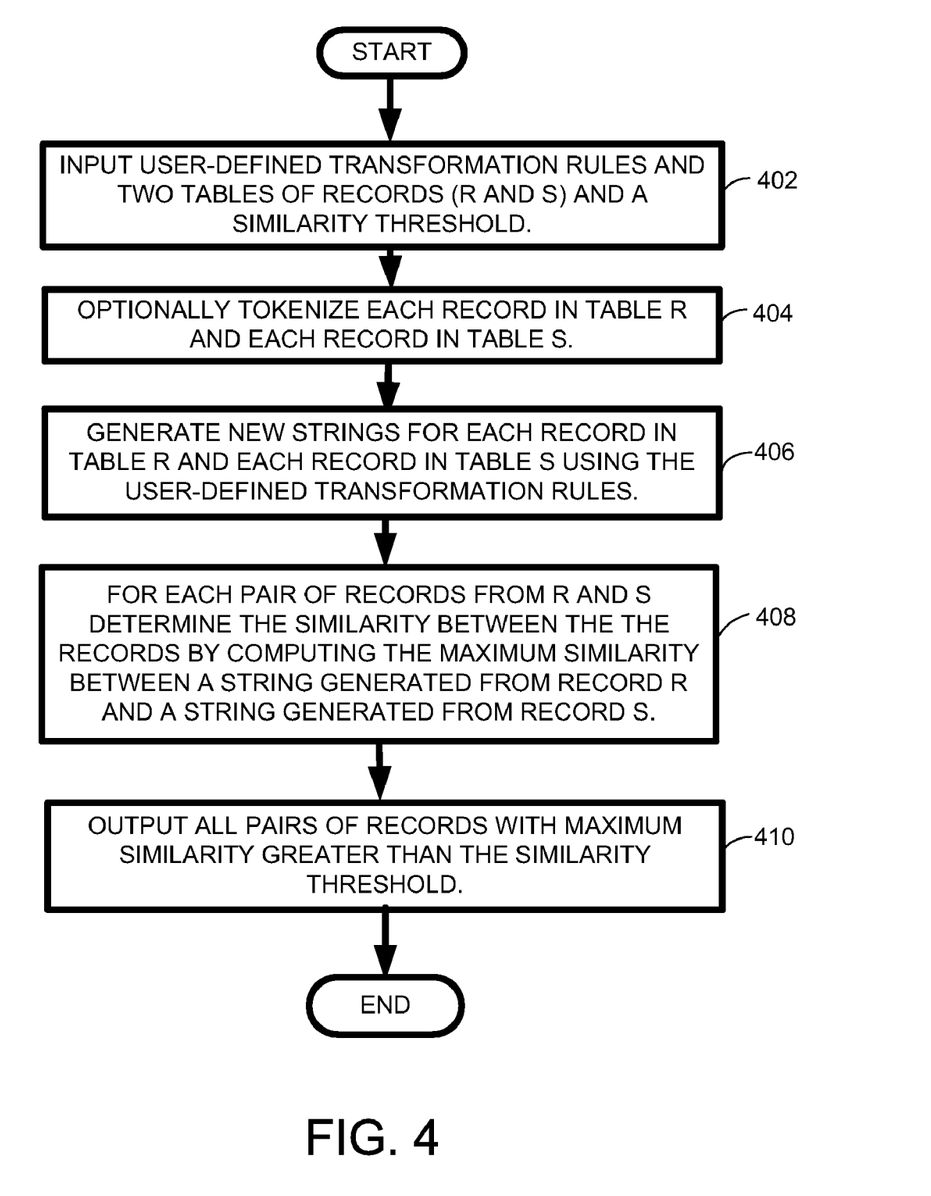
FIG. 4 is a flow diagram for another exemplary embodiment of a process for employing the transformation-based record matching technique.

FIG. 4 depicts a general flow diagram for another exemplary process for employing the transformation-based record matching technique. Details of the computations for this embodiment will be provided later in this specification. In this embodiment, one or more user-defined transformation rules, two different tables of records and a threshold for determining record or string similarity are input (box 402). The records can be tokenized, breaking each into substrings (box 404). New strings are generated for each input record using the user-defined transformation rules (box 406). For each pair of records from the two input tables the similarity between the records is determined by computing the maximum similarity between a string generated from the first record and a string generated from the second record (box 408). All pairs of records with similarity greater than the given threshold are then output (box 410).

Figure 5:
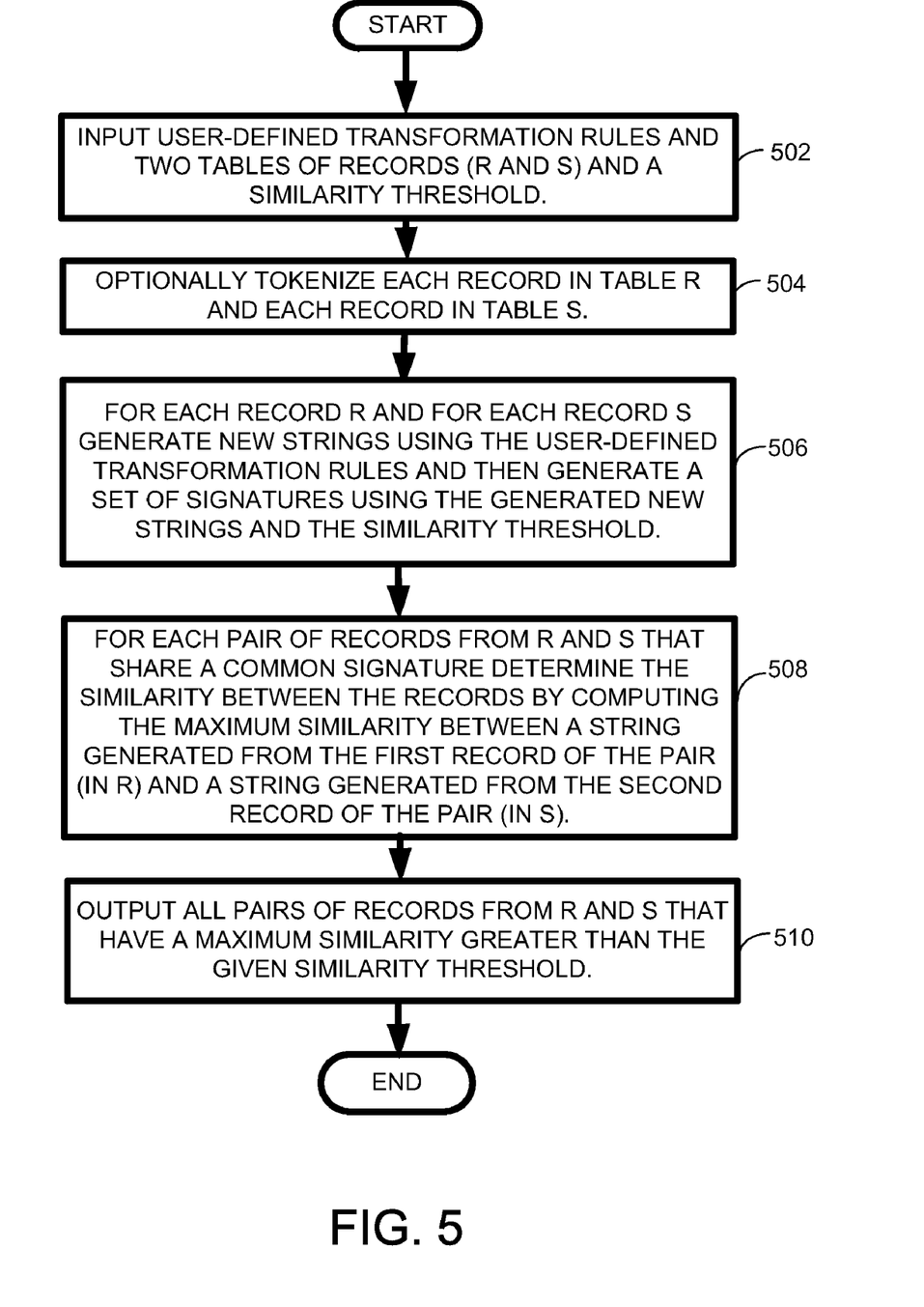
FIG. 5 is a flow diagram for yet another exemplary embodiment of a process for employing the transformation-based record matching technique.

FIG. 5 depicts a flow diagram of yet another exemplary process for employing the transformation-based record matching technique. Again, the details of the computations will be discussed later in this specification. In this embodiment, one or more user-defined transformation rules, two different tables of records and a threshold for determining record or string similarity are input (box 502). The records can be tokenized, breaking each into substrings (box 504). New strings are generated for each input record using the user-defined transformation rules and a set of signatures are generated for each input record based on the generated strings and the similarity threshold (box 506). For each pair of records from the two input tables that share a common signature the similarity between the records is determined by computing the maximum similarity between a string generated from the first record and a string generated from the second record (508). All pairs of records with similarity greater than the given threshold are then output (box 510).

Figure 6:
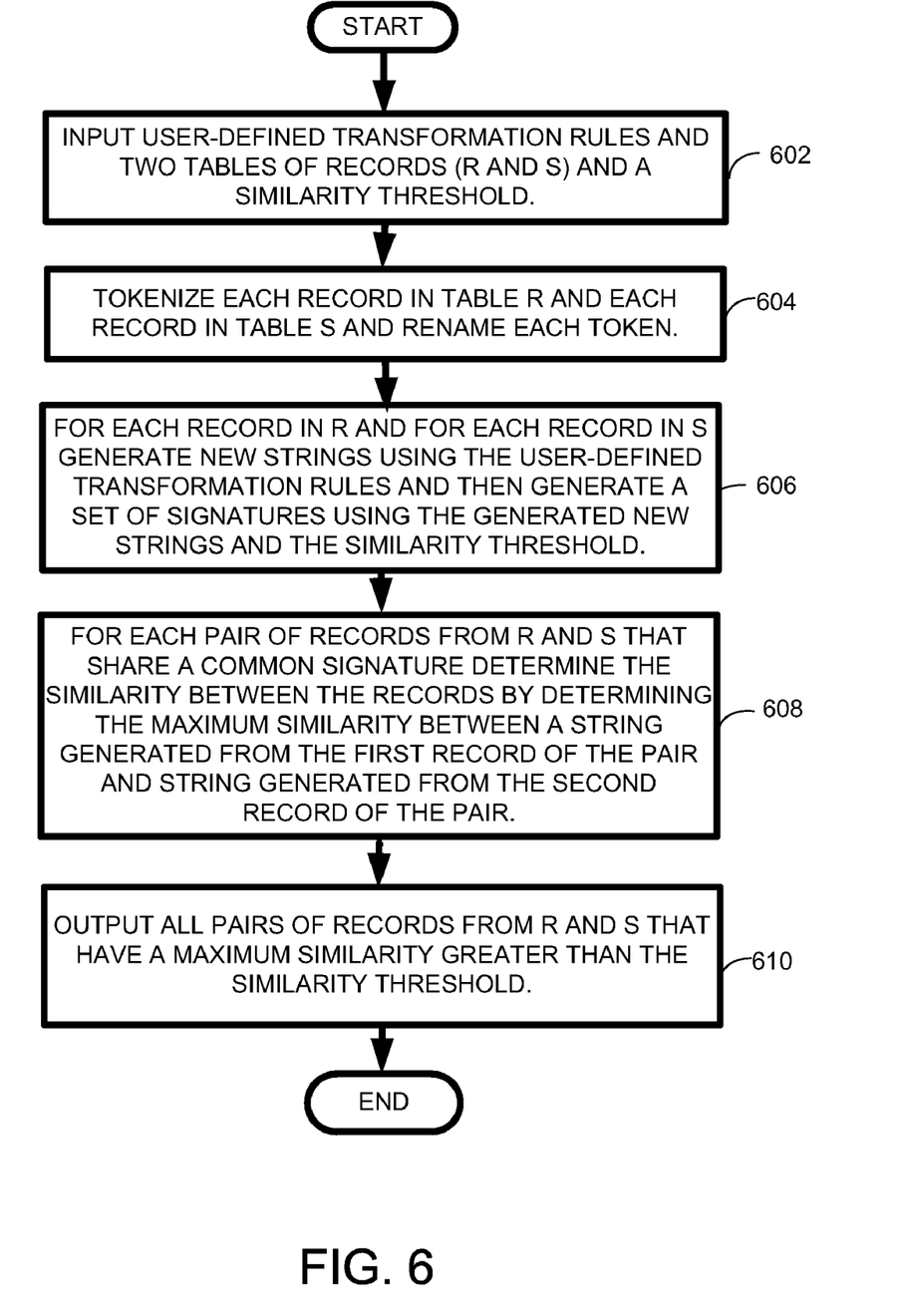
FIG. 6 is a flow diagram for still yet another exemplary embodiment of a process for employing the transformation-based record matching technique.

FIG. 6 depicts yet another exemplary process for employing the transformation-based record matching technique. Details of the computations will be discussed later in the specification. In this embodiment, one or more user-defined transformation rules, two different tables of records and a threshold for determining record or string similarity are input (box 602). The records can be tokenized, breaking each into substrings (box 604) and each token is replaced with its cluster identifier. New strings are generated for each input record using the user-defined transformation rules and a set of signatures are generated for each input record based on the generated strings and the similarity threshold (box 606). For each pair of records from the two input tables that share a common signature the similarity between the records is determined by computing the maximum similarity between a string generated from the first record and a string generated from the second record (608). All pairs of records with similarity greater than the given threshold are then output (box 610).

An exemplary architecture and exemplary processes employing the transformation-based record matching technique having been discussed, the remaining paragraphs provide details regarding implementations and variations of the above-discussed exemplary architecture and processes.

1.5 Computing Similarity Using Transformation Rules.

In this section the computation of the similarity or strings using transformation rules is discussed. This involves a discussion of transformation rules, computations of similarity, creating transformation rules and the relationship of transformations to formal grammar.

1.5.1. Using Transformation Rules to Transform Strings

Generally transformation rules generate a new set of strings for any given string; two strings are considered similar if some pair of strings generated from the original strings is similar. A transformation rule consists of a pair (context, Production) where production is of the form lhs→rhs. Each of context, lhs, rhs is a string. The sequence lhs cannot be empty, but rhs can be. A production without a corresponding context is called a context-free transformation and the production itself is used to denote the rule. Some example transformation rules are:

IL→Illinois
ACM→Association for Computing Machinery
33027, SW 154th Ave→Lacosta Dr E The first two rules are context-free, while the third is context sensitive.

A string s can be transformed given a set of transformation rules T. The transformations are driven by the productions. The context is used to identify a set of productions that are applicable to s. Let P(s) denote all productions where context is a substring of s (thus, all context free transformations are included in P(s)). The productions in P(s) can be used to transform s. A production P=lhs→rhs in P(s) can be applied to s if lhs is a substring of s; the result of applying the production is the string s' obtained by replacing the substring matching lhs with rhs. For example, one can use the transformation (33027, SW 154th Ave→Lacosta Dr E) to go from the string SW $154^{th}$ Ave, Miramar FL 33027 to Lacosta Dr E, Miramar FL 33027. However, the string SW 154th Ave, Miramar FL does not derive any new string since the context is not a substring.

One can apply any number of productions in P(s) one after another. However, a token that is generated as a result of production application cannot participate in a subsequent production. For example, one can use the production Drive→Dr to generate the string Lacosta Dr E from the string Lacosta Drive E. However, one cannot further convert Lacosta Dr E to Lacosta Doctor E using the production Dr→Doctor. Briefly, without this restriction, the transformation framework becomes intractable. The set of strings generated by s is the set of all strings obtained by applying zero or more productions in P(s) to s. To illustrate a more complex example, one considers the set of productions: (B C→X), (C D→Y), (D E→Z), (X Z→U) as applied to the string A B C D E. Note that overlapping portions of this string match different rules. Each such match derives a different string. The set of strings that are generated is {A B C D E, A X D E, A B Y E, A B C Z, A X Z}.

1.5.2 String Similarity

Finding similarities in character strings is an important problem in text processing and data mining. Various methods of finding string similarity are known, these include, for example, Hamming distance, Levenstein distance, Jaro distance metric, Jaro Winkler, Jaccard similarity, cosine similarity, edit distance and Euclidean distance, to name a few. The similarity between strings using transformation rules is captured using one of the traditional similarity functions.

The following discussion presents how the notion of string similarity can be extended in the presence of transformation rules, such as those employed by the transformation-based record matching technique. A similarity function f and a threshold $0 < \theta \leq 1$ together define a similarity predicate (f, $\theta$) that is satisfied by strings $(s_1, s_2)$ if $f(s_1, s_2) \geq \theta$. Given a set of transformation rules T, two strings $s_1$ and $s_2$ satisfy a similarity predicate (f, $\theta$) under T if there are strings $s'_1$ and $s'_2$ respectively generated by $s_1$ and $s_2$ using T such that $f(s'_1, s'_2) \geq \theta$. For example, suppose that the similarity predicate is equality. The string SW 154th Ave Florida 33027 is equal to the string Lacosta Dr E, FL 33027 under the transformations {FL→Florida, (33027, SW 154th Ave→Lacosta Dr E)}. This happens since both of the above strings generate the same string Lacosta Dr E, Florida 33027.

Following from the above discussion, one can assign a similarity score to two strings given a similarity function f and a set of transformations T. The similarity between strings $s_1$ and $s_2$ under T is defined to be the maximum similarity (as measured by f) among all pairs $s'_1$ and $s'_2$ respectively generated by $s_1$ and $s_2$ using T. With this definition, adding transformations can only increase the similarity between two strings. It should be noted that the above definition as stated does not penalize the application of a transformation rule for computing similarity. For instance, for the rules of the previously discussed example where one considered the set of productions: (B C→X), (C D→Y), (D E→Z), (X Z→U) as applied to the string A B C D E which generated the set of strings {A B C D E, A X D E, A B Y E, A B C Z, A X Z}, the similarity of both pairs (A B C D E, A B C D E) and (A B C D E, A X Z) is the same for any similarity function, although the first pair contains exactly identical strings, while the second does not. One can imagine scenarios where penalizing or costing the application of transformation rules is useful, and this can be done in several ways. One example is simply counting the number of rules applied. One can incorporate costs simply by taking as input a budget on the total cost of rules to restrict the number of strings generated by a given string. This methodology is independent of the underlying similarity function. Of course, this is not the only way to incorporate costs—one could for example aggregate the rule application costs with the final similarity value returned.

1.5.3. Generating Transformation Rules

One question that arises from the framework of the transformation based record matching technique is how the transformation rules can be obtained by a user. There are various ways of doing this. These include generating transformation rules using tables, programmatically generating them, or implicitly generating them, to name a few. Examples and details of some of these ways of generating transformation rules are discussed in the paragraphs below.

1.5.3.1 Generating Transformations Using Tables

It is possible for a user to obtain transformation rules through specialized tables that are readily available for various domains. This may be illustrated with the following examples. With respect to United States addresses, the United States Postal Service (USPS) publishes extensive information about the format of US addresses, which can be used to get transformation rules for address strings. The published information contains a comprehensive list of alternate representations of common strings such as street and st, and NE and North East. It also contains a list of about 176,000 street aliases. For example, the street name SW 154th Ave is also known as Lacosta Dr E in the postal area corresponding to zip code 33027 was drawn from this table. This set of aliases holds for a given zip code which constitutes the context. With respect to academic publications, the Digital Bibliography and Library Project (DBLP) website, a computer science bibliography website lists more that 970,000 articles on the computer science field and provides a list of conferences and their abbreviations, which can be used to derive transformation rules via screen-scraping. A user can also use the list of authors in the DBLP to get transformation rules corresponding to first name abbreviations. There are also several useful online resources such as, for example, www.acronymfinder.com, which contains extensive lists of abbreviations.

1.5.3.2 Generating Transformations Programmatically.

Transformation rules can also be programmatically generated. For example, one can generate rules that connect the integer and textual representation of numbers such as 25th and Twenty-Fifth.

1.5.3.3 Generating Transformations Implicitly.

Additionally, a set of transformation rules need not be explicitly specified, but can be specified implicitly using regular expressions. For example, the regular expression Rural Route \d+→RR \d+ conceptually specifies an infinite set of transformation rules of the form Rural Route i→RR i, for i=1, 2, . . . . One can apply such transformation rules to derive strings using standard techniques from regular expression matching.

1.6 Similarity Join with String Transformations

In Section 1.5 the notion of similarity under transformations was defined (this is based on a given underlying similarity function). As discussed previously, the goal of record matching is to find pairs of records that are similar. In practice, the record matching is implemented in two different settings. The indexing setting is where one of the input relations is given in advance. This relation is pre-processed to create an index which is then used at query time to take an input string and look up all records that are similar to it (FIG. 3). The join setting is where both the input relations are given and the goal is to find pairs of records that are similar (FIG. 4). The following discussion focuses on the join setting noting that the techniques presented herein are also applicable to indexing.

In one embodiment of the transformation-based record matching technique, a similarity join function is used. The formal similarity join problem can be stated as follows: Given two input relations R and S, a relation T containing transformations and a similarity threshold θ, find all pairs of strings (r, s), r∈R, s∈S whose similarity under T is greater than or equal to θ.

There are two components to this problem. First, for each string in R and S, one needs to find the set of matching transformations, i.e. transformations where both the context and lhs are substrings. Second, the set of matched productions is used to perform the similarity join. The process described in Table 1, mathematically describes the exemplary process shown in FIG. 4 that determines string similarity using a similarity join function. The boxes corresponding to the flow chart of FIG. 4 are annotated at each step of the process of Table 1.

TABLE 1

Baseline Similarity Join

INPUT: Relations R, S, T, similarity function f and threshold θ (box 402)
1. Let relations ExpandR and ExpandS be initialized to R and S respectively
2. For each r ∈ R, find every string r' generated by r under T and add (r, r') to ExpandR. (box 406)
3. For each s ∈ S, find every string s' generated by s under T and add (s, s') to ExpandS. (box 406)
4. Perform a similarity join on ExpandR and ExpandS to find tuples (r, r', s, s') such that f(r', s') ≧ θ (box 408)
5. Output all distinct pairs (r, s) from the tuples (r, r', s, s') returned by step 4. (box 410)

1.6.1 Finding Matching Transformations/Substrings

For a given input string x in either R or S, the goal is to find all strings where lhs of some transformation rule is its substring. Observe that if l is a substring of x, then l is a prefix or some suffix of x. A trie is constructed over all the distinct lhs in T. A trie is an ordered tree data structure that is used to store an associative array where the keys are usually strings. Every string in R and S is processed and for a given string, each of its suffixes is used to look up the trie. The trie identifies all distinct lhs of rules in T that are prefixes of the suffix being looked up.

1.6.2 Baseline Similarity Join

As discussed above, a fundamental operation in record matching is a similarity join, which identifies all pairs of strings (records) that are similar. The semantics of computing a similarity join under transformations suggests the algorithm/procedure outlined in Table 1 and shown in FIG. 4. The similarity join operation generates all derived strings using transformation rules and computes a similarity join over the derived strings. However, this technique is not very efficient because the number of derived strings can be very large. In step 3 of Table 1 (box 406 of FIG. 4), the original string is stored along with the string generated by it since the original strings are used in step 4 (box 408 of FIG. 4). In one implementation, an identifier is stored with every string that is used instead of the string itself.

In one embodiment of the transformation-based record matching technique, the procedure shown in Table 1 is used when treating the similarity function as a black box. There are several similarity functions for which the best known implementation of a similarity join is via a cross-product of the input relations. In such cases, step 4 of Table 1 (box 408 of FIG. 4) above involves computing a cross-product. While this is an expensive step, this is not an artifact of the transformation framework, rather a problem intrinsic to the similarity function chosen.

1.6.3 Similarity Join using Signatures

Signature-based similarity joins are much more efficient than the baseline similarity join discussed in the paragraph above. Efficient implementations over a relational database system have been proposed for a large class of similarity functions such as jaccard similarity, hamming distance, cosine similarity and edit distance based on signature-schemes.

A signature-based algorithm or procedure for computing the similarity join between R and S involving similarity predicate (f, θ) operates as follows: It first generates a set of signatures for each string in R and S. The signatures have the correctness property: if f(r, s)≧θ, then r and s share a common signature. Signature schemes have been proposed for several similarity functions such as edit distance and jaccard similarity. Based on this property, the signature-based algorithm or procedure employed in one embodiment of the transformation-based record matching technique generates candidate pairs by identifying all (r, s)∈R×S such that the set of signatures of r and s overlap. Since set overlap can be tested using an equi-join, a database management system is used for evaluating this step. Finally, in a post-filtering step, it checks the similarity join condition f(r, s)≧θ for each candidate pair (r, s), and outputs those that satisfy the condition.

Signature schemes can be illustrated through an example. Suppose the similarity function is jaccard similarity obtained by tokenizing two strings into sets of tokens (for example, the string "Microsoft Corporation" can be tokenized to obtain the set {"Microsoft", "Corporation"}) and computing the ratio of the (weighted) intersection size over the (weighted) union size. One previously proposed signature scheme for computing the similarity join between two relations with the predicate that the jaccard similarity be above threshold θ is prefix-filtering. To compute a similarity join with signatures, a global ordering is fixed over the universe of elements {1, . . . , m} that constitute the sets. The prefix filter of a set s at jaccard threshold θ is defined to be the subset of s containing the (1−θ)|s| smallest elements of s according to the global ordering. For example, if the global ordering of {1, . . . , m} is simply the natural number ordering, the prefix filter of {1, 3, 6, 8, 9} for jaccard similarity θ=0.6 consists of the two smallest elements of s, i.e., {1, 3}. One can show that prefix filter satisfies the correctness property required of signatures: the θ-prefix filters of two sets with jaccard similarity >θ have nonempty intersection. In practice, the ordering of elements induced by their frequency in the input sets (rarer elements are smaller) results in the best performance.

The following paragraphs focus on similarity functions that can be implemented using signature schemes. The straightforward way of using signature schemes is to use them in step 4 in Table 1. This involves generating signatures for each string in ExpandR and ExpandS. Since the number of strings generated by each string can be large, this approach can be prohibitively expensive. However, suppose that r∈R generates the set of strings $\{r_1, \ldots, r_m\}$ under T and that s∈S generates the set $\{s_1, \ldots, s_n\}$. This generates signatures for each $r_i$ and s. Denote the signature generated by string $r_i$ as $sign(r_i)$. Observe that: there exist i, j such that $sign(r_i) \cap sign(s_j) \neq \phi$ if and only if $(\cup_{i=1}^{m} sign(r_i)) \cap (\cup_{j=1}^{n} sign(s_j)) \neq \phi$. Thus, instead of generating each $sign(r_i)$, it suffices to generate $sign(r_i) = \cup_{i=1}^{m} sign(r_i)$ (respectively $sign(s_i) = \cup_{j=1}^{n} sign(s_j)$). This set can be significantly smaller since if some element appears in more than one distinct signature, it needs to be represented only once. This technique is referred to as signature compression. It can be illustrated through an example, as follows. Consider the citation record: N Koudas, S Sarawagi, D Srivastava. *Record linkage: Similarity Measures and Algorithms. Proceedings of the 2006 ACM SIGMOD International Conference*. Chicago, Ill., USA. The number of generated records is $2^6=64$. Suppose the set (of last names) {Koudas, Sarawagi, Srivastava} is a signature generated by all the 64 generated records. This is not unexpected for several common similarity functions since an overlap on the last names of the authors in a citation is indicative of a high value of similarity. This signature need not be replicated 64 times; one copy suffices. The overall signature-generation step is illustrated in Table 2. The process described in Table 2, mathematically describes the exemplary process shown in FIG. 5, previously discussed, that performs determines string similarity using a similarity signatures. Table 2 is annotated with the applicable steps of FIG. 5.

INPUT: Relations R, S, T and threshold θ. (box 502)
1. For each r∈R compute $sign(r_i) = \cup_{i=1}^{m} sign(r_i)$ where r generates the set $\{r_1, \ldots, r_m\}$. (box 506)
2. For each, s∈S, compute $sign(s_i) = \cup_{j=1}^{n} sign(s_j)$ where s generates the set $\{s_1, \ldots, s_n\}$. (box 506)
3. Generate all candidate pairs (r, s)∈R×S, satisfying $sign(r) \cap sign(s) \neq \phi$. (box 508)
4. Output any candidate pair (r, s) whose similarity under T is ≧θ. (box 510)

Table 2. Signature-Based Algorithm Using Compression 1.5.4. Optimizations for Jaccard Variants The signature compression technique illustrated above applies to any similarity function that can be supported via signature schemes. Clearly, a better knowledge of the similarity function is likely to open up even more opportunities for improving the execution efficiency of similarity joins. Optimizations that focus on jaccard similarity (denoted JaccSim) are now presented—these are computed by tokenizing two strings into (multiple) sets of tokens and taking the size of the intersection divided by the size of the union. In one embodiment of the transformation-based record matching technique, Jaccard similarity was chosen since it has been shown that supporting jaccard similarity efficiently leads to efficient implementations of several other similarity functions. Further, the optimizations described below can be applied to any set-based similarity function that has the property that for sets of a given size, the similarity score is monotonic with the intersection size (examples include hamming distance and trivially, set intersection.) The process described in Table 3 below, mathematically describes the exemplary process shown in FIG. 6. This process determines string similarity using a clustered signature similarity function. Table 3 is annotated with the applicable steps of FIG. 6.

INPUT: Relations R, S, T, threshold θ and a clustering of the tokens (box 602)
1. For each r∈R: Rename each matching transformation lhs→rhs to obtain cluster (lhs)→cluster (rhs) Compute ClusteredSign(r)=$\cup_{i=1}^{m} sign(r_i)$ where cluster (r) generates the set $\{r_1, \ldots, r_m\}$ using the renamed transformations (box 604)
2. For each s∈S, compute ClusteredSign(s) similarly (box 604)
3. Generate all candidate pairs (r, s)∈R×S, satisfying ClusteredSign(r)∩ClusteredSign(s)≠φ. (box 608)
4. Output any candidate pair (r, s) whose similarity under T is ≧θ. (box 610)

Table 3. Signature-Based Algorithm with Token Clustering

A well-known signature scheme for jaccard similarity is based on the idea of locality-sensitive hashing (LSH) which is used to generate compressed signatures. Before discussing the post-processing step, a technique for further reducing the number of signatures is first presented.

Token Clustering: The signature compression technique described previously exploits the resemblance among the strings generated by a given input string—the more the resemblance, the greater the opportunities for compression. This resemblance is further enhanced by clustering all the tokens. Suppose a new token is assigned corresponding to each cluster of tokens. For a token t, let cluster (t) denote the token corresponding to the cluster to which t is assigned. For a string x, let cluster (x) denote the string obtained by replacing every token t with cluster (t). One can see that the following property holds. Consider two strings r∈R, s∈S along with the transformations that match them. The jaccard similarity of JaccSim(cluster (r), cluster (s))≧JaccSim(r, s). Thus, the procedure in Table 2 (or FIG. 5) could be modified as follows: before finding the set of strings generated by a given string, rename both the string and the matching transformations according to the token clustering, generate signatures and then do the post-filtering step with the original (un-renamed) strings. The renaming cannot miss any pair of strings that satisfy the similarity predicate. Thus, this modification is correct. This is outlined in Table 3 and FIG. 6 (previously discussed).

The advantage yielded by this is that if there are rules where a single token yields a large number of alternatives—such as is the case with abbreviations where for instance the first initial J could lead to a large number of first names beginning with J—these rules would shrink to a single rule all of these first names and the letter J are clustered. The procedure outlined in Table 3 and FIG. 6 returns the same (correct) result independent of the clustering used.

This raises the question of what clustering yields the best overall benefit. On the one hand, if one leaves every token in its own cluster, then the resemblance among the generated strings is unaffected and one gets no benefit whatsoever. On the other hand, if one collapses all tokens into a single cluster, then the resemblance among generated strings is maximized, but the number of false positives returned when the signatures are joined is likely to be excessively high. Based on this observation, the goal is defined so that tokens that appear on the rhs side of the same lhs are more likely to be in the same cluster, whereas tokens that do not appear together on the rhs side of the same lhs are less likely to be in the same cluster. This intuition is captured by using the well-known paradigm of correlation clustering.

In one embodiment of the transformation-based record matching technique a post-processing step of the signature-based procedure, shown in FIG. 6 (box 610) and Table 2, involves checking for a given pair of strings r, s for whether the similarity predicate under transformations holds (this step is performed with the original, un-renamed strings and transformations). The straightforward method of checking this condition is to actually compute all strings generated by r and s, compute their cross-product and check exhaustively whether there is some pair satisfying the similarity predicate. The problem of computing the jaccard similarity between two input strings r, s given a set of transformations is non-deterministic polynomial time hard. However, it is observed in practice that a large class of transformations are such that both the lhs and rhs are single tokens (e.g., St→Street). They are called single-token transformations. Interestingly, if all transformations are single-token, then it is possible to compute the jaccard similarity between two strings (under the transformations) in polynomial time. This is achieved by reducing this problem to bipartite matching a technique commonly used in matching problems. Observe that under single-token transformations, the length of all generated strings is the same and equals the length of the original string. Thus, maximizing the jaccard similarity reduces to maximizing the size of the token-(multi)set intersection.

Consider a bipartite graph where one has the set of tokens from r and s on either side. An edge is drawn between two tokens $t_r$ and $t_s$ (on either side) of this graph if (1) they are equal, or (2) there is a rule $t_r \rightarrow t_s$, or (3) there is a rule $t_s \rightarrow t_r$, or (4) there is some t such that there are rules $t_r \rightarrow t$ and $t_s \rightarrow t$. The size of the maximum matching in this graph can be shown to be the maximum intersection size one is seeking. In one embodiment of the transformation-based record matching technique, in the presence of single- and multi-token transformations, exhaustive checking is limited to the multi-token transformations.

2.0 The Computing Environment

The transformation-based record matching technique is designed to operate in a computing environment. The following description is intended to provide a brief, general description of a suitable computing environment in which the transformation-based record matching technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 7:
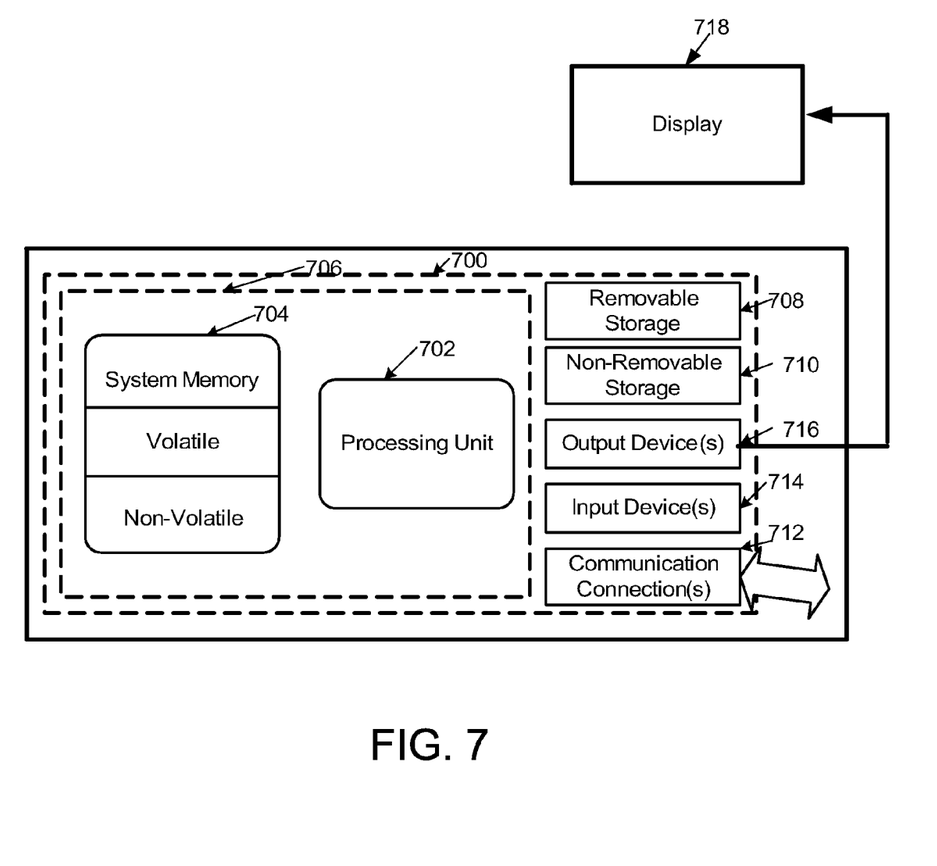
FIG. 7 is a schematic of an exemplary computing device in which the transformation-based record matching technique can be practiced.

FIG. 7 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 7, an exemplary system for implementing the transformation-based record matching technique includes a computing device, such as computing device 700. In its most basic configuration, computing device 700 typically includes at least one processing unit 702 and memory 704. Depending on the exact configuration and type of computing device, memory 704 may be volatile (such as RAM), non-volatile (such as ROM, flash memory, etc.) or some combination of the two. This most basic configuration is illustrated in FIG. 7 by dashed line 706. Additionally, device 700 may also have additional features/functionality. For example, device 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer readable instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 700. Any such computer storage media may be part of device 700.

Device 700 has a display 718, and may also contain communications connection(s) 712 that allow the device to communicate with other devices. Communications connection(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 700 may have various input device(s) 714 such as a keyboard, mouse, pen, camera, touch input device, and so on. Output device(s) 716 such as speakers, a printer, and so on may also be included. All of these devices are well known in the art and need not be discussed at length here.

The transformation-based record matching technique may be described in the general context of computer-executable instructions, such as program modules, being executed by a computing device. Generally, program modules include routines, programs, objects, components, data structures, and so on, that perform particular tasks or implement particular abstract data types. The transformation-based record matching technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. For example, process actions may be reordered in some embodiments of the technique. In some embodiments the input string can be tokenized and transformed, while the records of the database records are not. Or the database records can be tokenized and transformed while the input string is not. The specific features and acts described above are disclosed as example forms of implementing the claims.

Wherefore, what is claimed is:

1. A computer-implemented process for matching records, comprising using a computer to perform the following process actions:
   inputting user-defined string transformation rules;
   inputting an input string for which a matching record is sought from a set of records in a database;
   tokenizing the input string by breaking the input string into smaller strings;
   generating new strings for the input string by applying the user-defined string transformation rules to the input string tokens;
   generating new record strings for each of the records of the set of records in the database by using the user-defined string transformation rules;
   obtaining signatures for each of the input string, new strings for the input string, the records in the database, and the new record strings for each of the records in the database;
   only for pairs of strings or records with common signatures, determining the similarity of the input string to each record in the set of records in the database by directly comparing the input string and the new strings generated for the input string to each record of the set of records in the database and the generated new record strings; and
   outputting records from the set of records in the database and the generated records strings that are similar to the input string based on the determined similarity.

2. The computer-implemented process of claim 1 wherein the user-defined string transformation rules are implicitly generated by using mathematical expressions.

3. The computer-implemented process of claim 1 further comprising tokenizing the records of the set of records prior to generating new record strings.

4. The computer-implemented process of claim 1 further comprising using a similarity join operation to determine the similarity.

5. The computer-implemented process of claim 4 further comprising using a signature-based similarity join operation to determine similarity only between records that have common signatures.

6. The computer-implemented process of claim 1 further comprising using a similarity threshold to determine whether the input string and each record of the set of records is similar.

7. The computer-implemented process of claim 1 wherein the user-defined transformations are obtained from publicly available databases.

8. A system for matching a user-defined string to a record string in a database, comprising:
   a general purpose computing device; and
   a computer program comprising program modules executable by the general purpose computing device, wherein the computing device is directed by the program modules of the computer program to,
   input one or more user-defined transformation rules wherein the user-defined transformation rules are obtained from publically available published information for databases that contains a comprehensive list of alternate representations of common strings;
   input a first input string for which a match from a database of records is sought;
   input record strings for a database of records;
   generate new input strings from the first input string for which a match is sought using the user-defined transformation rules;
   generate new record strings from the record strings for the database of records using user-defined transformation rules;
   determine the similarity between the first input string and generated new input strings and the record strings by directly comparing the first input string and generated new input strings to each record string and each generated new record string; and
   output a set of potential matches between the first input string and the record strings based on the determined similarity.

9. The system of claim 8 further comprising a program module to determine the best potential matches between the first input string and the record strings using a threshold test to determine if the first input string and the record strings are similar enough to meet the threshold test.

10. The system of claim 8 wherein the program module to determine the similarity further comprises using a jaccard similarity function for determining string similarity.

11. The system of claim 8 further comprising modules for generating a signature for the first input string, each new input string, each record string and each generated new record string and using the signatures to determine similarity by identifying strings with overlapping signatures.

12. The system of claim 11 further comprising a program module to cluster the signatures prior to determining similarity.

13. The system of claim 8 further comprising a program module to tokenize the first input string and input record strings.

14. A computer-implemented process for record matching comprising using a computer to perform the following process actions:
   inputting user-defined string transformation rules that transform strings of characters into equivalents, two tables of records R and S, and a similarity threshold;
   for each record of table R and each record of table S, generating new strings using the user-defined string transformation rules;
   generating a signature for each record of table R and each record of table S using the new strings generated by using user-defined string transformations for table R and table S;
   determining pairs of records from table R and table S that have a common signature;
   only for each pair of records from table R and table S that share a common signature computing the maximum string similarity between a string generated from the first record of the pair from table R and a string generated from the second record of the pair from table S; and
   outputting all pairs of records from table R and table S that have a common signature and a maximum string similarity greater than the similarity threshold.

15. The computer-implemented process of claim 14 further comprising tokenizing each record in table R and each record in table S and renaming each token prior to generating the set of signatures by using user-defined string transformations.

16. The computer-implemented process of claim 14 further comprising using a Jaccard similarity function for determining maximum string similarity.

17. The computer-implemented process of claim 16 wherein the signatures used are based on locality-sensitive hashing (LSH).

18. The computer-implemented process of claim 14 further comprising using a Hamming distance similarity function in determining maximum string similarity.

19. The computer-implemented process of claim 14 further comprising using an edit distance similarity function in determining maximum string similarity.

20. The computer-implemented process of claim 14 further comprising obtaining the user-defined transformation rules by screen scraping.

* * * * *

UNITED STATES PATENT AND TRADEMARK OFFICE
CERTIFICATE OF CORRECTION

PATENT NO. : 8,032,546 B2  
APPLICATION NO. : 12/031715  
DATED : October 4, 2011  
INVENTOR(S) : Arvind Arasu et al.

It is certified that error appears in the above-identified patent and that said Letters Patent is hereby corrected as shown below:

In title page, item (75), under "Inventors" column 1, line 2-3, after "Surajit Chaudhuri, Redmond, WA (US)" insert -- ; Shriraghav Kaushik, Bellevue, WA (US) --.

Signed and Sealed this  
Twenty-seventh Day of December, 2011

David J. Kappos  
*Director of the United States Patent and Trademark Office*